(12) United States Patent
Alastalo et al.

(10) Patent No.: US 7,006,529 B2
(45) Date of Patent: Feb. 28, 2006

(54) METHOD FOR ARRANGING COMMUNICATION BETWEEN TERMINALS AND AN ACCESS POINT IN A COMMUNICATION SYSTEM

(75) Inventors: Ari Alastalo, Helsinki (FI); Kari Leppänen, Helsinki (FI); Mika Kasslin, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 882 days.

(21) Appl. No.: 09/853,396

(22) Filed: May 11, 2001

(65) Prior Publication Data

US 2001/0047424 A1 Nov. 29, 2001

(30) Foreign Application Priority Data

May 12, 2000 (FI) .................................. 20001133

(51) Int. Cl.
*H04J 3/16* (2006.01)
(52) U.S. Cl. ...................................... 370/468; 370/345
(58) Field of Classification Search ................ 370/329, 370/330, 331, 332, 334, 335, 336, 337, 339, 370/341, 342, 343, 344, 350, 431, 435, 436, 370/437, 468, 503–520
See application file for complete search history.

(56) References Cited

U.S. PATENT DOCUMENTS 5,260,968 A * 11/1993 Gardner et al. ............. 375/347
5,657,317 A    8/1997 Mahany et al. ............. 370/338
5,889,825 A *  3/1999 Schreib ..................... 375/347
5,909,471 A *  6/1999 Yun ........................... 375/343
5,930,243 A *  7/1999 Parish et al. ................ 370/334
6,047,189 A *  4/2000 Yun et al. ................ 455/452.2

FOREIGN PATENT DOCUMENTS

WO    WO 96/22662    7/1996
WO    WO 98/27669    6/1998

OTHER PUBLICATIONS

"The Smart Wireless LAN System: Physical Layer Design and Results." Okamoto et al., In Vehicular Technology Conference, 1997, IEEE 47$^{th}$, pp. 1312-1316.

* cited by examiner

*Primary Examiner*—Dang Ton
*Assistant Examiner*—Phuc Tran
(74) *Attorney, Agent, or Firm*—Perman & Green, LLP.

(57) ABSTRACT

The invention relates to a method for arranging communication between terminals and an access point in a communication system applying data transmission frames. The data frames (FR) comprise timeslots for uplink and downlink communications between the terminals and the access points. The terminals can be allocated one or more timeslots in frames. The spatial signature of at least two terminals is determined, and in at least part of the frames, at least partly simultaneous timeslots are allocated to at least two terminals. Measurements are taken of a signal transmitted by the terminal and used to estimate the timing and frequency offsets and the properties of the communication channel. The simultaneous time slot allocation for terminals is done based on measurement results.

48 Claims, 10 Drawing Sheets

Figure 1:
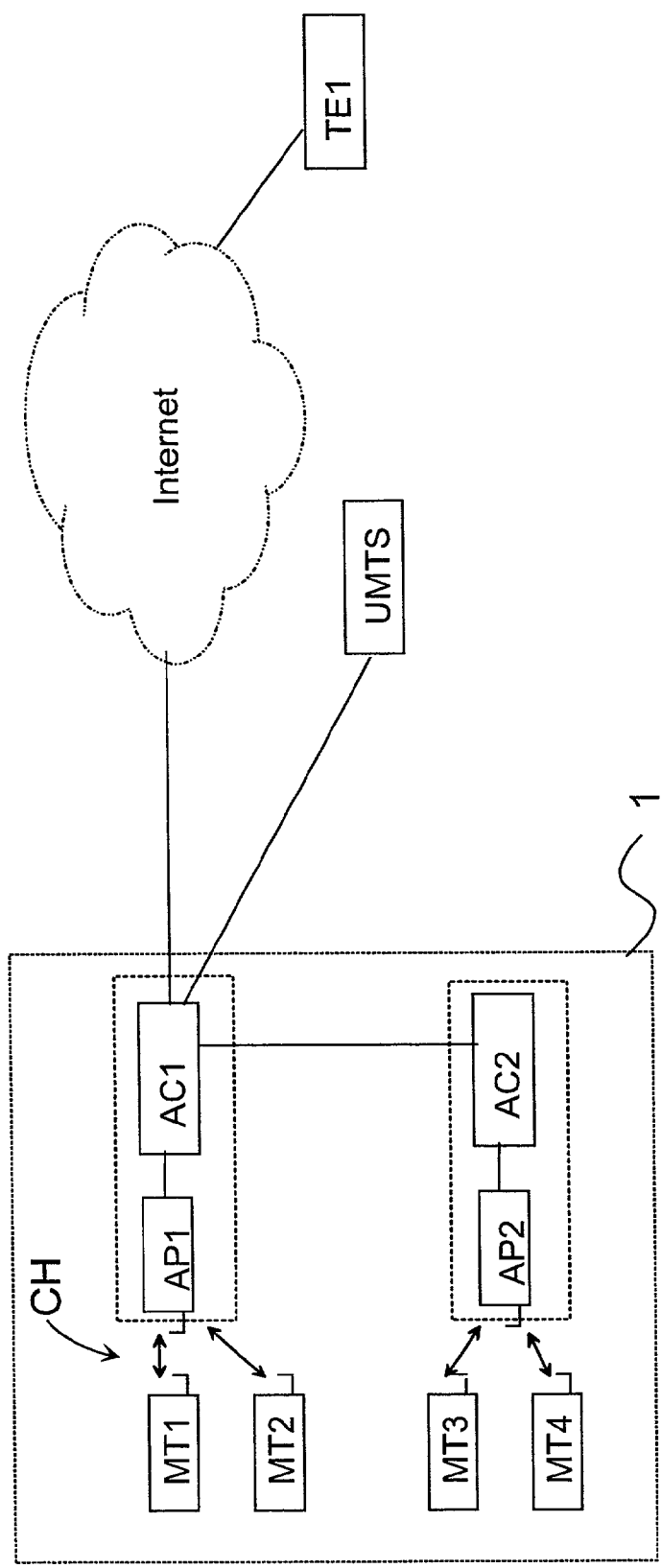

METHOD FOR ARRANGING COMMUNICATION BETWEEN TERMINALS AND AN ACCESS POINT IN A COMMUNICATION SYSTEM

The present invention relates to a method for arranging communication between terminals and an access point in a communication system, as set forth in the preamble of the appended claim 1. Furthermore, the invention relates to a communication system according to the appended claim 37 and an access point according to the appended claim 38.

Space division multiple access (SDMA) relates to a technology whereby information can be simultaneously transmitted between a base transceiver station and more than one terminals, such as wireless stations. One known method for applying space division multiple access in a communication system is the use of so-called smart antennas. A smart antenna consists of more than one antenna elements, i.e. an array of antennas, and a method (for example a digital signal processing algorithm) for utilizing the array of antennas in an optimal way. By adjusting the amplitudes and phases of signals to be transmitted from (received from) different elements, the directional pattern of the array of antennas can be adjusted to direct the transmission and reception to a desired location. The accuracy of the directing depends on the algorithms used, as well as on e.g. the type, number and geometrical positioning of the antenna elements. Moreover, a smart antenna can be used to direct different signals to terminals in different locations simultaneously.

Time division duplex (TDD) refers to communication in which two data transmission devices, such as a base transceiver station and a terminal, communicate with each other so that transmission and reception take place at the same channel frequency but at a different time. A system based on time division multiple access (TDMA) may comprise several data transmission connections, wherein separation between different data transmission connections is made in time, i.e., each data transmission connection is used for transmitting information in a time slot allocated for this connection, while information is not transmitted in other data transmission connections using the same channel frequency. An example of a system based on time division multiple access and applying time division duplex data transmission is the HIPERLAN/2 communication system. The HIPERLAN/2 communication system is intended e.g. for wireless local area networks (WLAN), to be used for example in office buildings.

One drawback in the TDD-TDMA system is the fact that information can be transmitted to a base station by only one terminal at a time. In a corresponding manner, the base station can transmit information to only one terminal at a time, excluding broadcasting intended for several terminals, whereby the base station can inform the terminals e.g. the time when each terminal can transmit to the base station.

In the space division system, the antenna of the base station must have a structure whereby transmission and reception can be directed to a desired location. In the space division system, the terminals using the same time slot are separated from each other on the basis of spatial signatures, i.e. the properties of the radio channel between the terminal and the base station. The spatial signature of each terminal is measured at the base station from the signal received by the base station. In view of the spatial signature, it is essential in which way the radio channel between the terminal and the base station is changed when it is viewed from the different antenna elements of the array of antennas of the base station. Normally, such estimation of spatial signatures is based on the use of a so-called known training sequence. Such a training sequence is transmitted in connection with a signal transmitted from the terminal. Thus, the base station can use the measured spatial signatures to separate different terminals from each other.

In the HIPERLAN/2 system, a standardized training sequence is used for estimating the radio channel as well as the frequency offset and the timing offset. Channel estimates measured from different antenna elements of a base station, which in the HIPERLAN/2 system is also called an access point, can further be used to estimate the spatial signature of each terminal. In the TDD system, the same measurement results can be used in both directions of communication, since the channel frequency used is the same in these different directions, i.e. uplink from the terminal to the base station and downlink from the base station to the terminal.

It has been generally assumed that in the time division system, a separate training sequence is required for each terminal to be served in the same time slot. This applies when it is desired to perform determination of the timing offset, determination of the frequency offset and channel estimation simultaneously for each of the terminals to be served in the same time slot. Furthermore, different training sequences are required to be orthogonal in order to separate different terminals from each other. This makes the system more complicated, because extra signalling is needed between the base station and the terminals to select the training sequence. Furthermore, the terminals should store all the possible training sequences to be able to use them, if necessary. Moreover, the number of training sequences fulfilling the above-mentioned conditions is limited, considering the properties of the communication system and the fact that the more training sequences are used, the more signalling and memory space is required in the terminal and in the base station.

It is an aim of the present invention to provide a space-division communication system applying time-division duplex communication and time-division multiple access technology, and with only one choice defined for a training sequence. The method according to the present invention is characterized in what will be presented in the characterizing part of the appended claim 1. Further, the communication system according to the present invention is characterized in what will be presented in the characterizing part of the appended claim 37. Moreover, the access point according to the invention is characterized in what will be presented in the characterizing part of the appended claim 38. The invention is based on the idea that when channel estimates and time and frequency offsets are measured in a base station, only one terminal is controlled to transmit a training sequence and that other terminals do not transmit during this time. Also, the base station does not transmit information to other terminals during this measurement sequence.

Considerable advantages are achieved with the present invention when compared with solutions of prior art. In the communication system according to the invention, information can be simultaneously transmitted between an access point and different terminals in the same time slot. Thus, the use of communication resources is more efficient than in systems of prior art. Moreover, noise can be reduced, because the transmissions are, for a major part, directed and, on the other hand, the transssmission power can be even reduced. In the communication system according to the invention, also possible collisions in communication are reduced.

Figure 2:
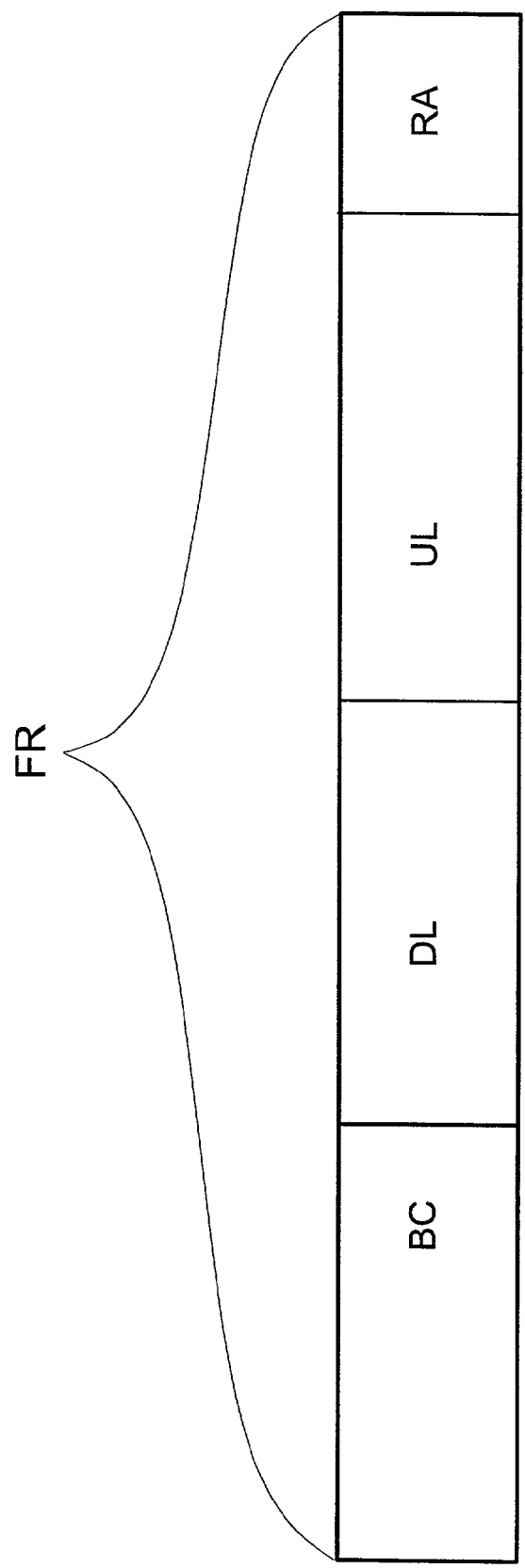
Figure 3:
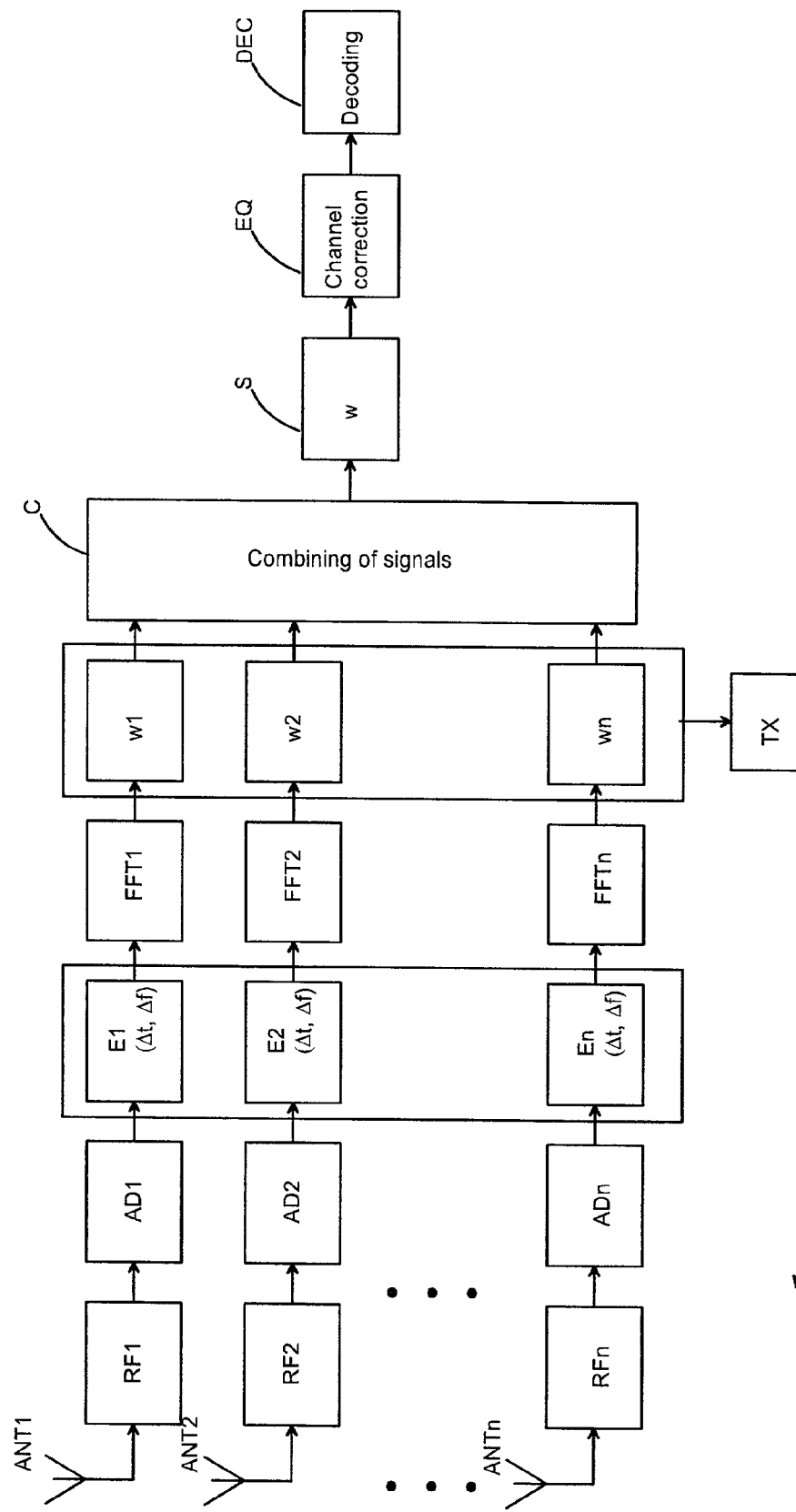
Figure 4:
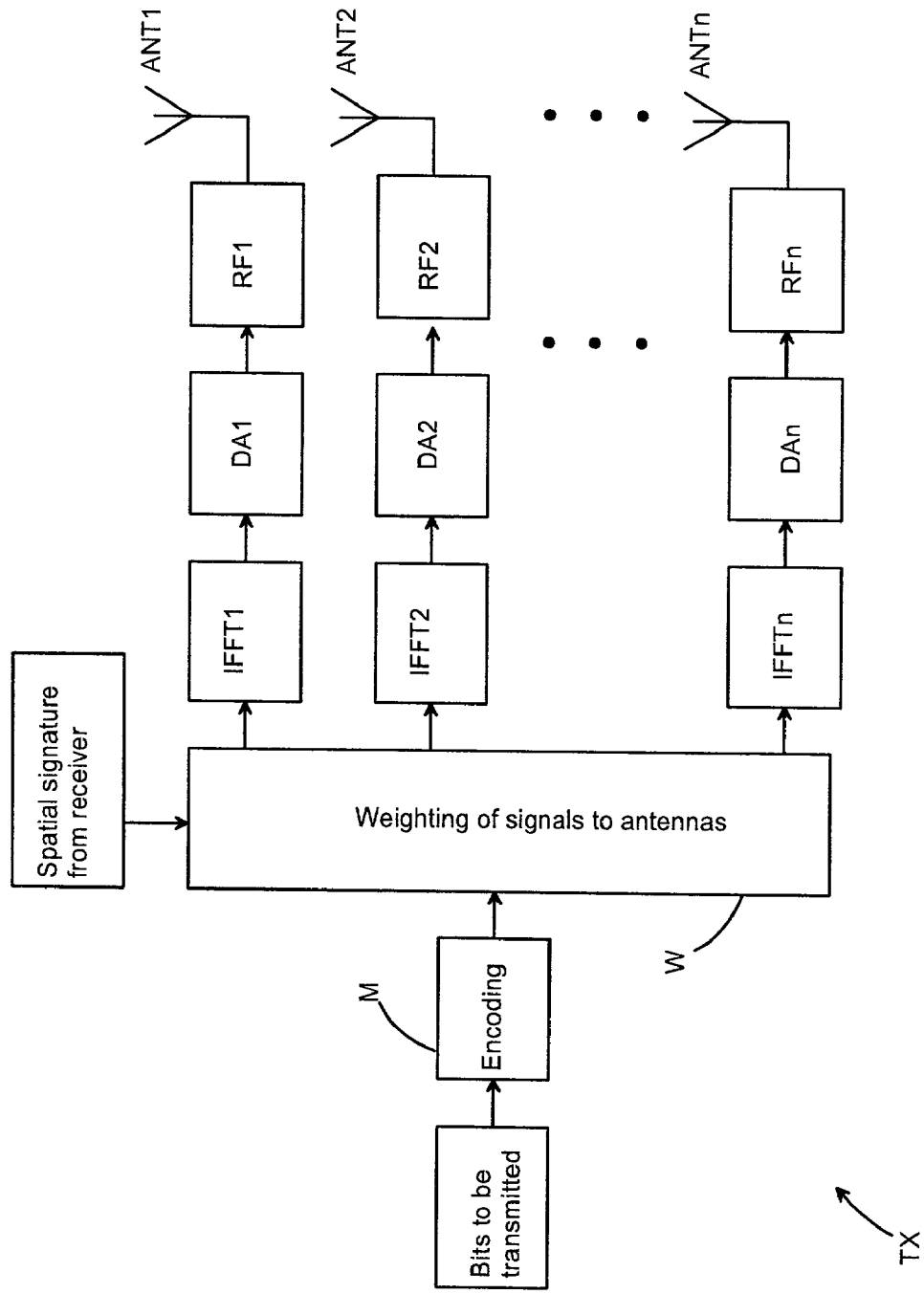
Figure 5:
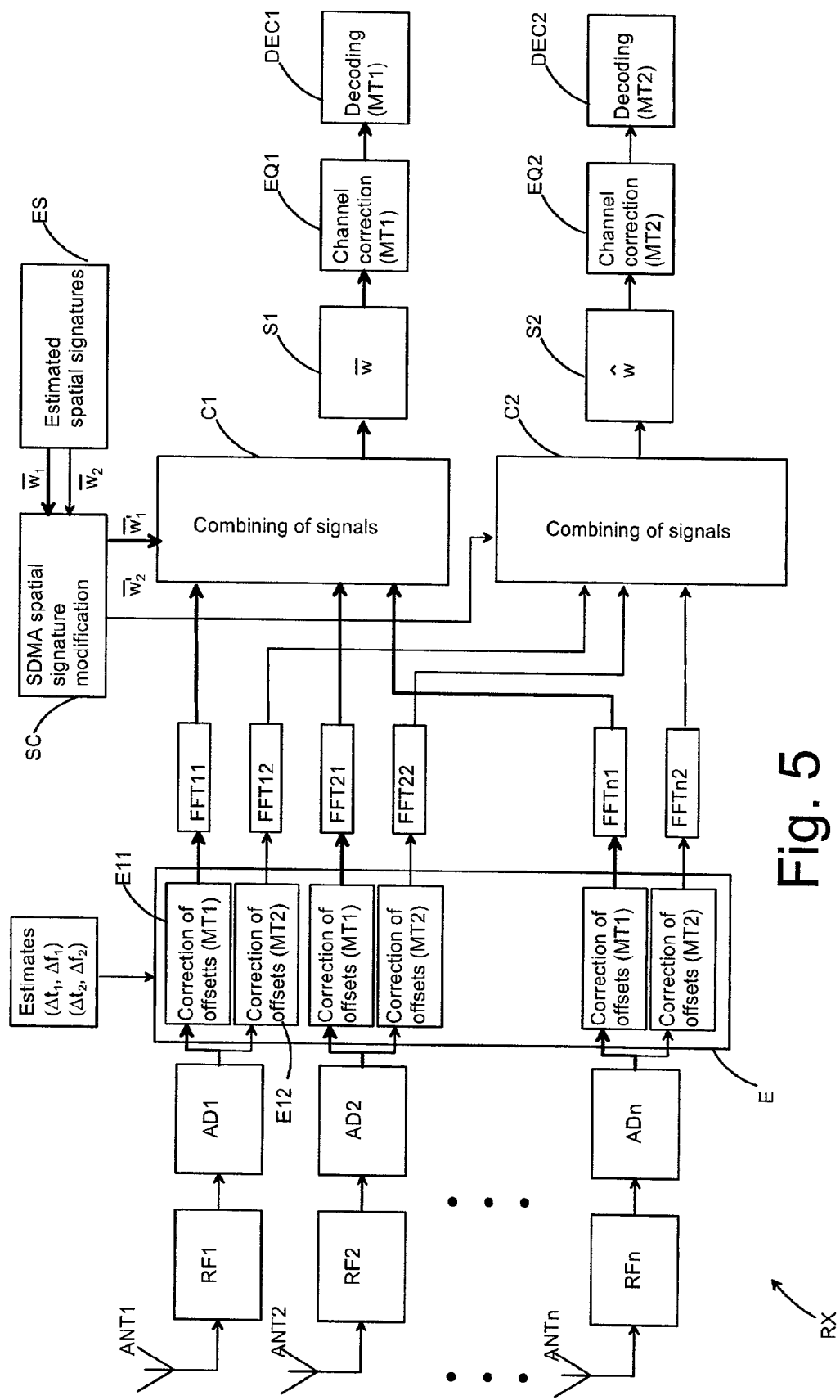
Figure 6:
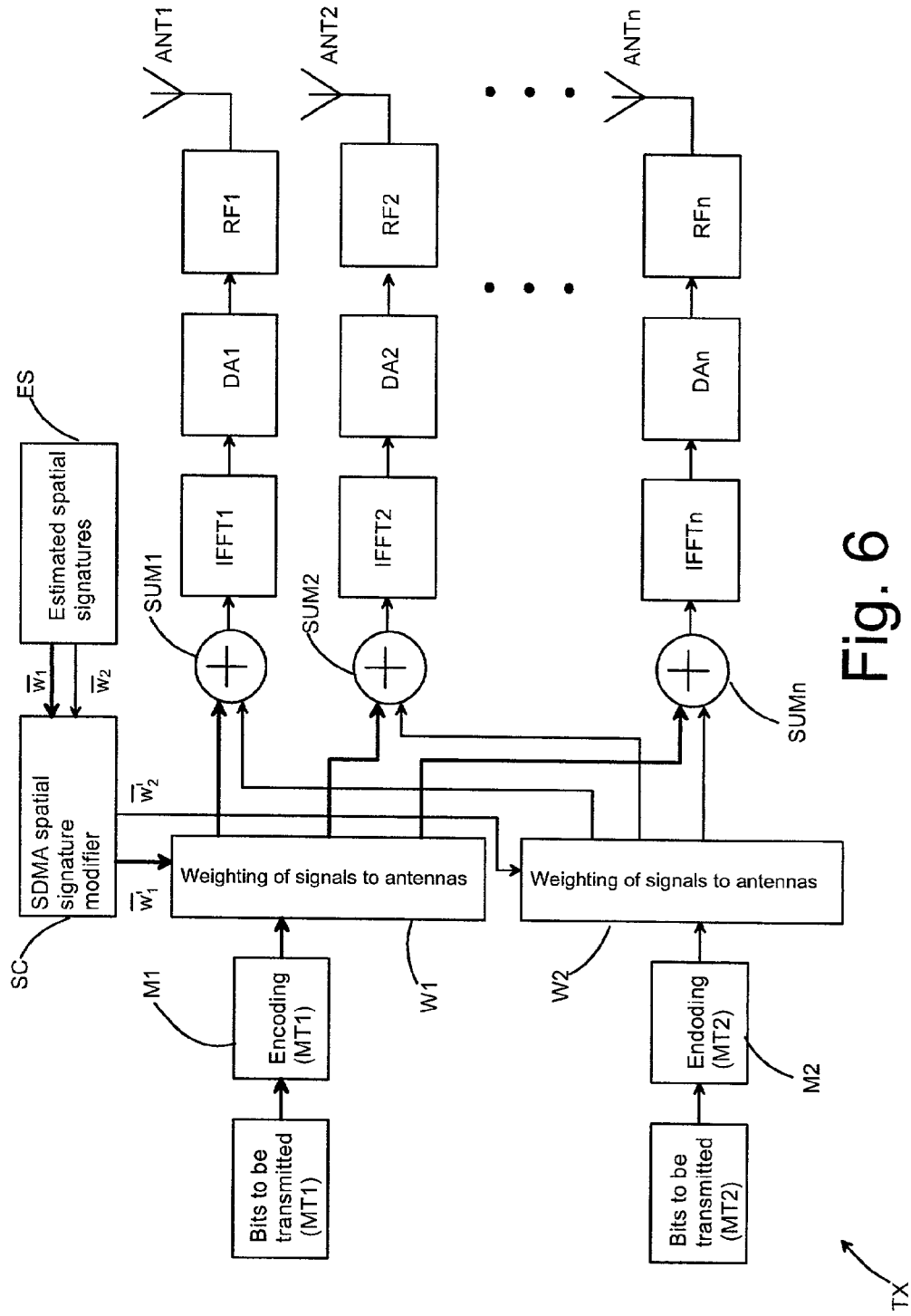
Figure 7:
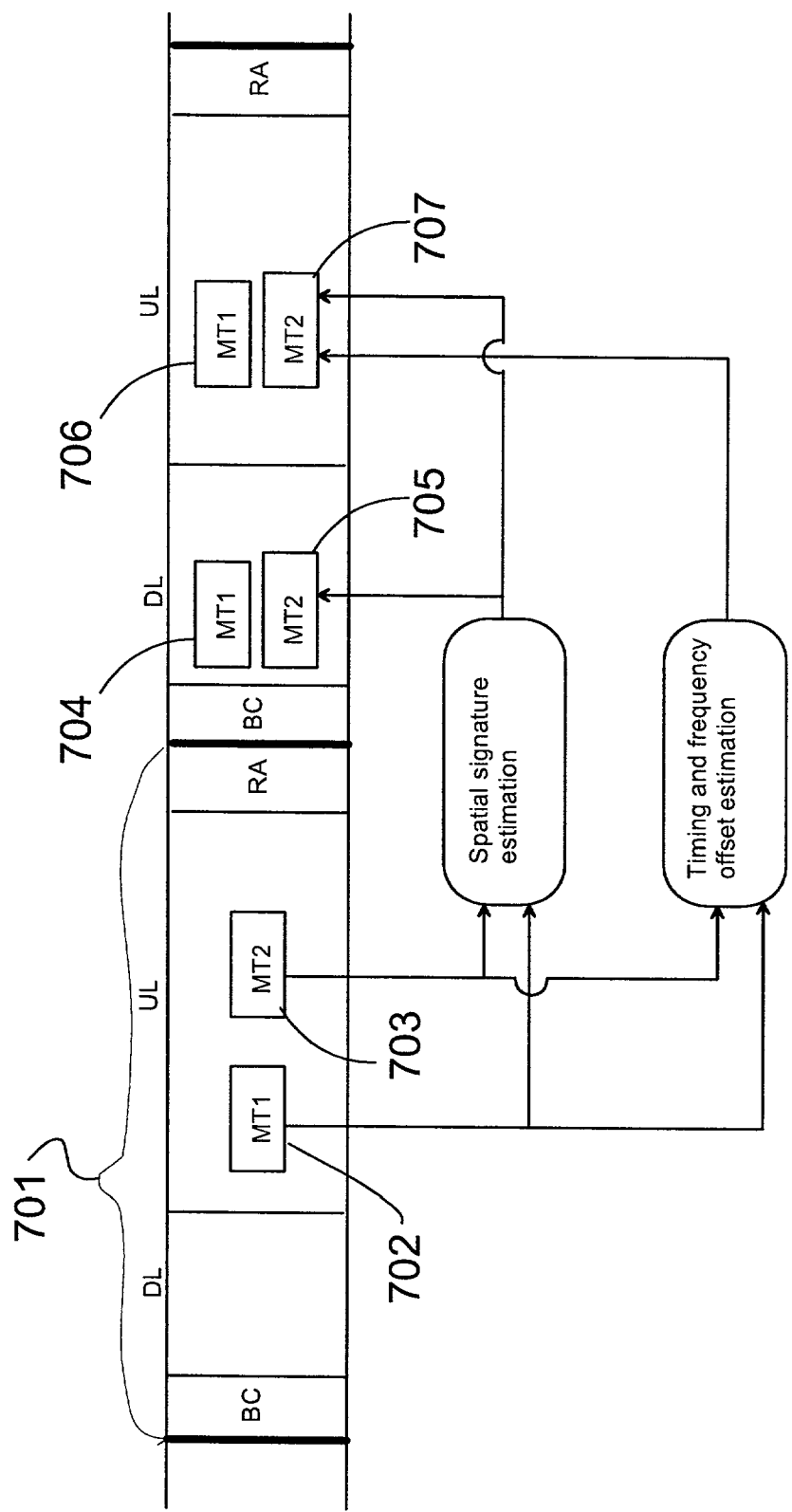
Figure 8:
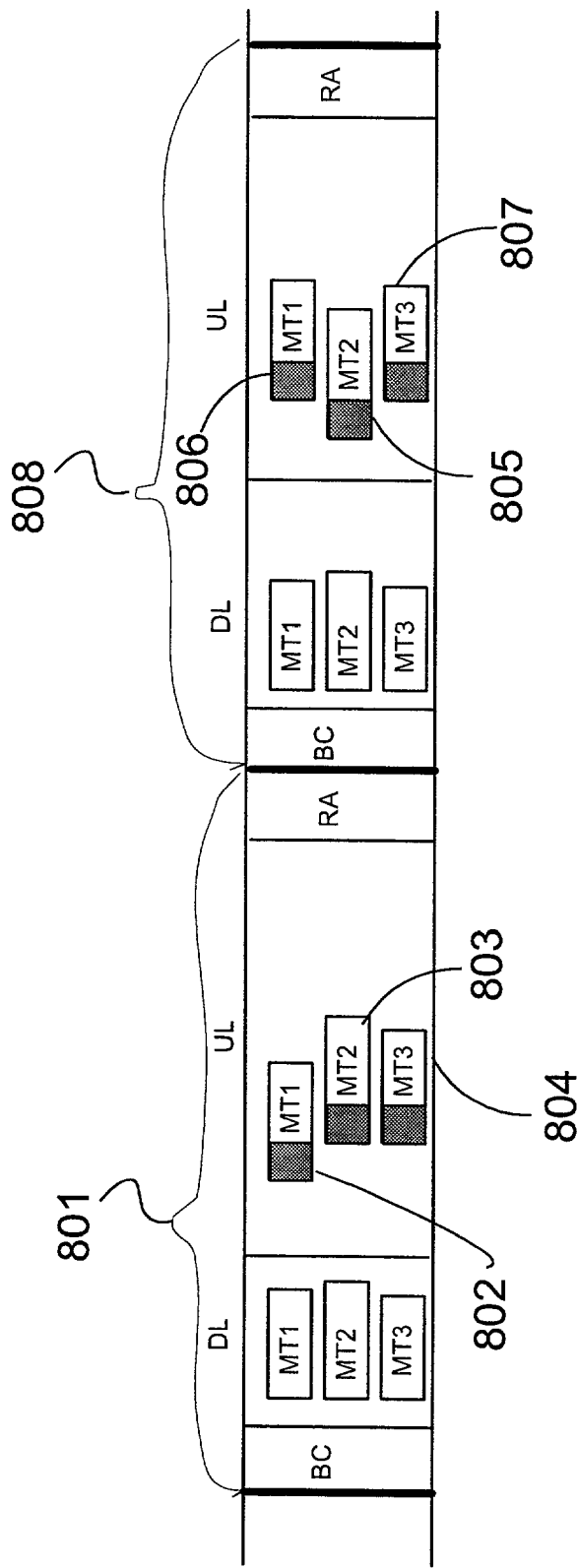
Figure 9:
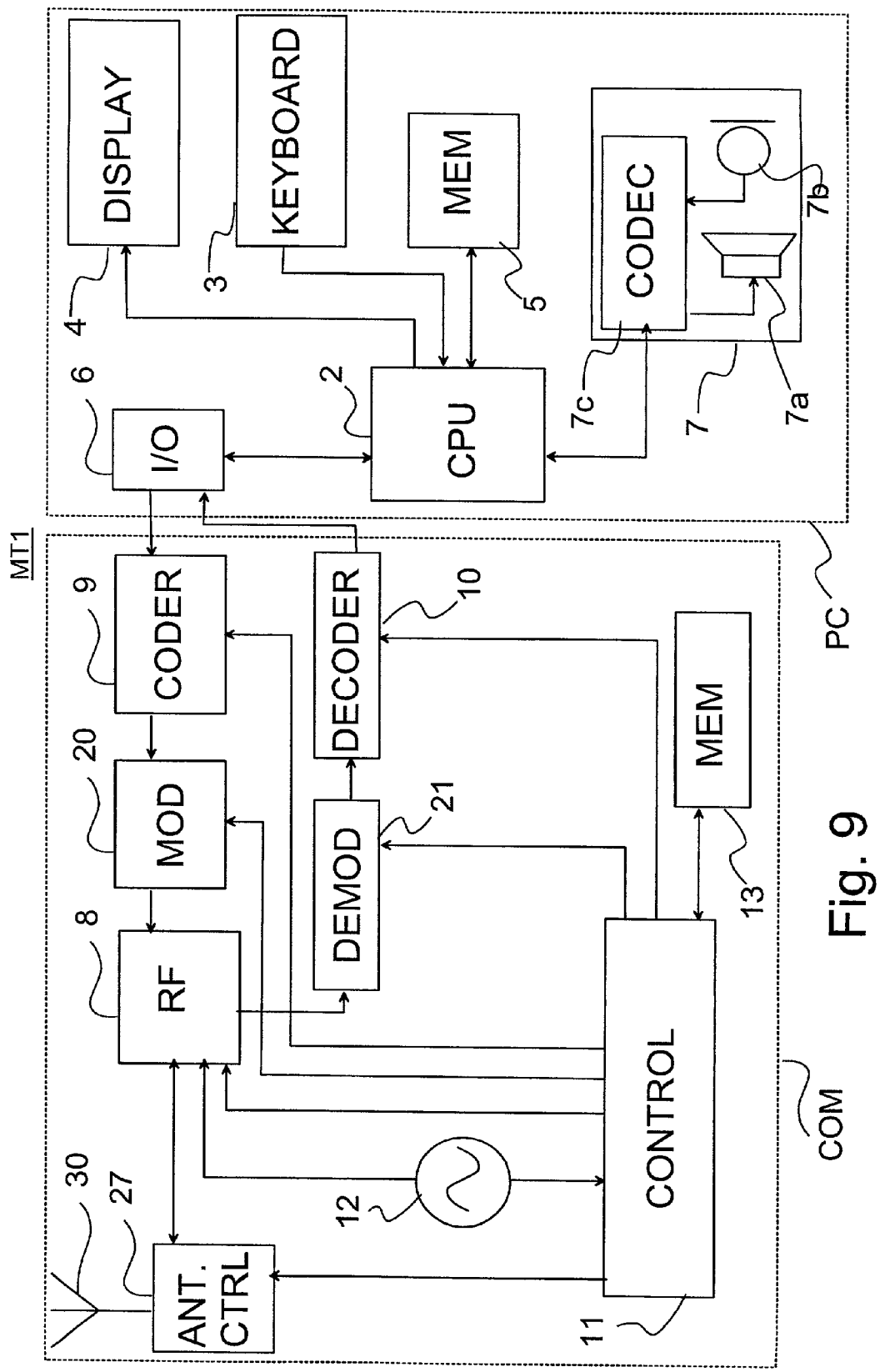
Figure 10:
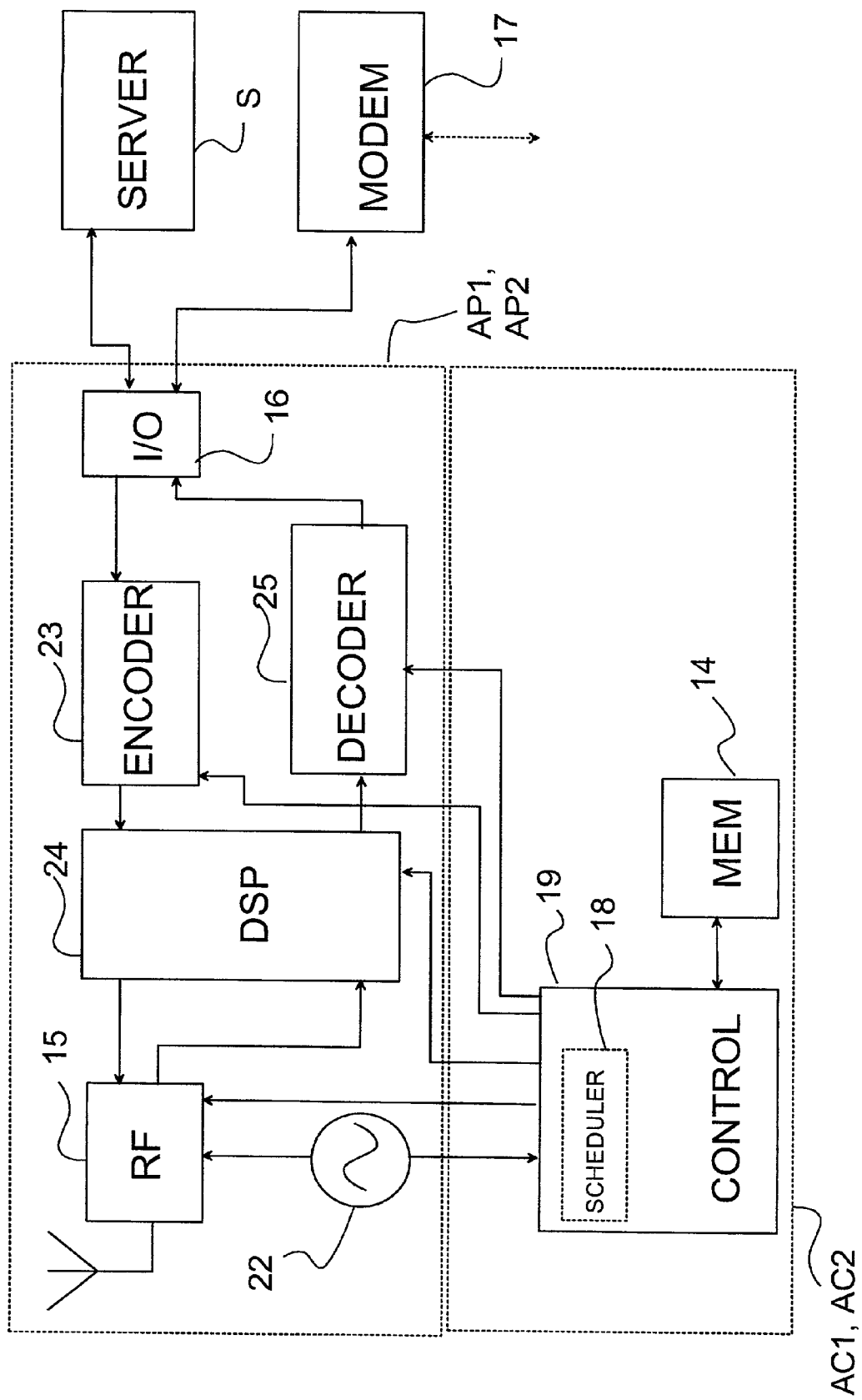

In the following, the invention will be described in more detail with reference to the appended drawings, in which FIG. 1 shows a communication system in which the invention can be applied, FIG. 2 shows an example of a MAC frame structure in a communication system according to FIG. 1, FIG. 3 shows a receiving block of an access point according to an advantageous embodiment of the invention in a reduced block chart, FIG. 4 shows a transmitting block of an access point according to an advantageous embodiment of the invention in a reduced block chart, FIG. 5 shows signal processing in a receiver of FIG. 3 in a situation in which two terminals communicate with an access point, FIG. 6 shows signal processing in a transmitter of FIG. 4 in a situation in which information is transmitted from an access point to two terminals simultaneously, FIG. 7 shows, in a reduced chart, an advantageous example of space division timing, FIG. 8 shows another advantageous example of space division timing, FIG. 9 shows a terminal according to an advantageous embodiment of the invention in a reduced block chart, and FIG. 10 shows an access point according to an advantageous embodiment of the invention in a reduced block chart.

In the following, the invention will be described by using as an example of a communication system the HIPERLAN/2 system, shown as a reduced block chart in FIG. 1, applying time-division duplex communication and time-division multiple access technology. That is, the system is a so-called TDD-TDMA system. The communication system 1 consists of mobile terminals MT1–MT4, one or several access points AP1, AP2, as well as an access point controller AC1, AC2. The access point AP1, AP2 and the access point controller AC1, AC2 do not necessarily need to be separate units but their functions can be integrated into a unit which can be preferably called an access point or an access point controller. A radio connection is arranged between the access point AP1, AP2 and the mobile terminal MT1–MT4 for transmitting e.g. signals required for setting up a connection and, during the connection, information, such as data packets of an Internet application. The access point controller AC1, AC2 controls the operation of the access point AP1, AP2 and the connections formed thereby to the mobile terminals MT1–MT4. The access point controller AC1, AC2 comprises a controller 19 (FIG. 10) whose application software contains implementations of functions of the access point, such as an access point scheduler for performing various timing operations in a way known as such. In such a radio network, several access point controllers AC1, AC2 may communicate with each other and with other data networks, such as the Internet network, the Universal Mobile Terminal System (UMTS) mobile communication network, etc., wherein the mobile terminal MT1–MT4 may communicate e.g. with a terminal TE1 coupled to the Internet network.

FIG. 2 shows, in a reduced manner, a frame structure to be used in the communication system 1 according to FIG. 1. A frame FR consists of a broadcast phase BC, in which the access point AP1, AP2 broadcasts general announcements and information on the current frame, e.g. on uplink and downlink time slots assigned for terminals MT1–MT4, to the terminals MT1–MT4. Downlink time slots DL are intended for the transmission of information from an access point to the terminals and, in a corresponding manner, uplink time slots UL are intended for receiving information from the terminals to the access point. The frame FR also comprises a random access slot RA in which a terminal with no resources allocated for data transmission can request the access point to allocate one or more time slots in the next frames for the terminal in question. The terminals also perform logging in the communication network by means of this random access slot. Furthermore, the random access slot is used in a situation in which a terminal is performing handover of access points for transferring the connections to the access point to which the connection is handed over. Such a situation comes up e.g. when the terminal is moving and the quality of the connection to the access point used is impaired.

In the HIPERLAN/2 system, applying orthogonal frequency division multiplexing (OFDM), the training sequence consists of two identical consecutive OFDM symbols (training symbols) in which each of the 52 subcarriers contains data defined in the standard. The HIPERLAN/2 system applies 64 subcarrier frequencies, but of these only 52 subcarriers are used for data transmission. Of these 52 subcarriers, in turn, four are used as pilot carriers in all OFDM symbols; that is, the data presented by them is predetermined in the standard. All the subcarriers used in the training symbols represent predetermined data. Thus, the radio frequency radio channel (H) between the terminal and an element n of the array of antennas of the base station for a subcarrier k can be calculated for example in the following way:

$$H_n[k] = \left(\frac{1}{2}\sum_{p=1}^{2} x_n[k,p]\right) \times d[k]^*, \quad (1)$$

in which $x_n[k,p]$ is a signal received from the antenna element n in the frequency domain at a subcarrier frequency k=0,1, . . . ,51 representing the $p^{th}$ training symbol in a training sequence transmitted by the terminal, d[k] is the training symbol determined in the standard for the subcarrier k, and the character * as superscript indicates complex conjugation. Because the effect of the radio channel is generally shown in time domain as a convolution with the transmitted signal, this corresponds, at each subcarrier frequency in the frequency domain, to complex multiplication of the transmitted symbol and the radio channel. Block charts of a receiver will be presented hereinbelow to illustrate how a signal $x_n[k,p]$ in the frequency domain can be derived from a received signal in the time domain. It is now possible to determine a weighting coefficient vector (block ES, FIG. 5), whose complex conjugate is used in the base station to weight uplink signals received from the terminal by different antenna elements or downlink signals to be transmitted from different antenna elements to the terminal in question, for example depending on the frequency in the following way:

$$\overline{w}[k](H_0[k],H_1[k],H_2[k], \ldots ,H_{N-1}[k])^T, \quad (2)$$

in which the superscript T indicates transposition and N is the number of antenna elements. The weighting coefficient vector (2) is also called a spatial signature. The weighting coefficient vector (2) can be used both uplink and downlink. For uplink, it is also possible to estimate the interference content of the received signal for example by forming a remainder signal $$r_n[k,p] = x_n[k,p] - H_n[k] \times d[k] \quad (3)$$

for both training symbols (p=1, 2) transmitted. To eliminate interference in uplink reception, the weighting coefficient vector can now be modified for example by multiplying it with the inverse matrix of the position correlation matrix of the remainder signal:

$$\overline{w}_{opt}[k]=(Q[k,p]+\gamma \times I)^{-1}\times \overline{w}[k], \quad (4)$$

in which Q[k,p] is the position correlation matrix of the remainder signal:

$$Q[k,p]=\overline{r}[k,p]\times \overline{r}[k,p]^H, \quad (5)$$

$$\overline{r}[k,p]=(r_0[k,p],r_1[k,p],r_2[k,p], \ldots r_{N-1}[k,p])^T, \quad (6)$$

the superscript H indicates complex conjugate transposition, I is N×N unit matrix and γ is a small constant (for example, γ=0.01) which makes the inverse matrix operation well-behaved in the equation (4). In the equations (3–6), it is possible, for example, to restrict to use only one of the received training symbols, that is, for example to set p=1 in the equations (3–4). Alternatively, the inverse matrix for the equation (4) can be calculated for each training symbol separately (p=1 and p=2) and to take the average of these inverse matrices. Good simulation results have also been obtained by averaging the position correlation matrix over the frequency, by calculating the inverse matrix as in equation (4), and finally by taking the average over the training symbols:

$$\overline{w}_{opt}[k] = \left\{\frac{1}{P}\sum_{p=1}^{P}\left[\left(\frac{1}{K}\sum_{k=0}^{K-1}Q[k,p]\right)+\gamma \times I\right]^{-1}\right\}\times \overline{w}[k], \quad (7)$$

in which thus P=2 and K=52 for the HIPERLAN/2 system. The elimination of interference as described above is generally suitable for uplink only, because during downlink in the TDD-TDMA system various sources of interference are generally present. Thus, for downlink, for example the original weighting coefficients $\overline{w}[k]$ are used.

As the access point applies space division multiple access (SDMA) for example for simultaneous transmission to M different terminals, the spatial signatures of the terminals are generally modified (block SC, FIG. 5), that is, the weighting coefficients $\overline{w}_m[k]$ of the weighting coefficient vector are modified to the form $$\overline{w}'_m[k]$$

so that when a signal intended for a terminal m=1, 2, ..., M is weighted by the weighting coefficients $$\overline{w}'_m[k],$$

the power received by the terminal m is as high as possible and at the same time the power received by other terminals to be simultaneously served from the transmission in question is as low as possible. Thus, for example, it can be required that:

$$\overline{w}'^H_a[k]\cdot \overline{w}_b[k] = \delta_{a,b} \; \forall \, k, \quad (8)$$

in which $\delta_{a,b}$ is Kronecker delta and $\forall k$ indicates that the condition is valid for each subcarrier frequency separately.

This condition can be fulfilled for example by using the pseudo inverse:

$$A_{sdma}[k]=(A[k]^+)^H, \quad (9)$$

in which the superscript + indicates pseudo inverse and N×M matrices A[k] and $A_{sdma}$[k] are defined:

$$A[k]=(\overline{w}_1[k],\overline{w}_2[k], \ldots \overline{w}_M[k]) \quad (10)$$

and $$A_{sdma}[k] = (\overline{w}'_1[k], \overline{w}'_2[k], \ldots \overline{w}'_M[k]) \quad (30)$$

A corresponding modification in receiving means that when the received signal is combined with the weighting coefficients $\overline{w}'_a[k]$, the signal transmitted by the terminal a is amplified as much as possible, whereas the signals transmitted simultaneously by other terminals is attenuated as much as possible. In other words, the signal transmitted by the terminal a is summed from the different antenna elements as coherently as possible when weighted with the weighting coefficients $$\overline{w}'_a[k],$$

whereas the signals of other terminals transmitting simultaneously are summed as incoherently as possible.

The use of a smart antenna is most suitable for bilateral data transmission between the terminal and the access point. However, it is advantageous to perform broadcasting or such transmissions which are intended to be received by several terminals by, for example, using only one of the antenna elements of the smart antenna. Alternatively, it is possible to use such a separate antenna whose directional pattern covers the whole service range of the access point. In practice, this means that the antenna configuration is altered when shifting from a general phase to downlink time slots in a frame. In a corresponding manner, in a random access phase, the access point should receive signals from an area as large as possible, because the access point does not know the spatial signature of such a terminal which is not logged in the network. Thus, also in a random access phase, an omni-directional antenna configuration is preferably used, or a signal is received from one antenna element only. However, in this random access phase, the access point can also receive and store the signals of all the different elements, wherein the stored signals can be later used for estimation of the spatial signature of the terminal.

The access point measures the spatial signatures of the terminals MT1–MT4 and stores the data in a memory in the receiving phase and/or in the random access phase. These data can be used in the same transmission phase and in the phases of receiving and transmitting of the next frames, because the frequencies used in them are substantially the same, and also for the reason that it is assumed here that the channel is changed relatively slowly in relation to the length of the frame. Thus, if estimation of the spatial signature has been performed for the terminal, the access point can use this data in the next data transmission to this terminal, if the access point considers the data to be still sufficiently reliable. If necessary, the estimation of the spatial signature can be performed again.

In normal smart antenna operation (as opposite to spatial access operation), in which information is transmitted between the access point and only one terminal at a time, there is no need to store timing offset estimates nor frequency offset estimates at the access point, but these can be estimated separately from each received transmission. Also the radio channel (and thus the spatial signature) can be estimated from each received transmission separately. However, the spatial signature is preferably stored at the access point also in the normal smart antenna operation, to be used in downlink phase.

If spatial filtering is performed in time domain, before the access point estimates the timing and frequency offsets of each terminal in the receiving phase, it is not necessary, in connection with the space division access technology, to store the time and frequency offset estimates at the access point but only the spatial signatures to be used in normal smart antenna transmission as well as in space division reception and transmission. This applies even in the case of only one training sequence in use. This is because the time and frequency offsets can be estimated from the combined (spatial filtered) signal already. The estimation of the spatial signature in time domain can be performed e.g. with the well-known recursive least squares (RLS) algorithm. Alternatively, it is possible, for example, to construct the time-domain spatial signature on the basis of the channel estimates in the frequency domain. This can be made e.g. either by averaging over the frequency or by inverse Fourier transform, wherein the combination in the time domain is performed by antenna-specific FIR filters produced by the inverse Fourier transform.

In communication systems applying orthogonal frequency division multiplexing (OFDM), such as HIPERLAN/2, the operations for controlling a smart antenna are preferably performed in frequency domain. Also in this case, the access point estimates the timing and frequency offsets of each terminal preferably in the time domain, i.e. upon reception even before spatial filtering. Upon reception of simultaneous transmission by several terminals with different time and frequency off-sets, these offsets cannot be estimated before spatial filtering. Thus, to make space division possible in systems with one training sequence choice, in addition to the spatial signature also the time and frequency offset estimates should be stored in a situation in which a training sequence is received from the terminal in such a way that no transmission is simultaneously received from another terminal.

FIG. 3 shows the receiver block RX of an access point according to an advantageous embodiment of the invention in a reduced block chart. The receiver block is intended for receiving OFDM modulated signals. The OFDM modulated signals transmitted by the terminals are received in different antenna elements. Each antenna element of the smart antenna is provided with a receiver block comprising a high-frequency part RF1, RF2, RFn, an analog-to-digital converter AD1, AD2, ADn, a correction block E1, E2, En, a time-to-frequency converter FFT1, FFT2, FFTn, such as a fast Fourier converter, and a radio channel estimation block w1, w2, wn. In the high-frequency part RF1, RF2, RFn, the high-frequency signal is converted to one or several intermediate frequencies, or the signal can be directly converted to a baseband signal. After this, the analog signal is converted to digital form in an analog-to-digital converter AD1, AD2, ADn. The correction block E1, E2, En is used for estimating and correcting the time and frequency offsets of the terminal. This is preferably performed by means of the formulas (1) to (11) presented above, but it is obvious that also other methods can be used for determining the spatial signatures as well as for correcting time and frequency offsets and the channels in connection with the present invention. It should be noted herein that the correction of time and frequency offsets should be the same in all the receiver branches when the different branches are synchronized with each other. It is thus possible to improve the time and frequency offset estimates for example by averaging the estimates of the different antenna branches. After making the corrections, the signals are converted to the frequency domain in the time-to-frequency converter FFT1 FFT2, FFTn. In the access point AP1, AP2, the estimation of the radio channel is performed for each antenna branch separately. From the radio channel, a spatial signature is obtained, which is used in a combination phase C for signal weighting and combining. In the uplink, it is also possible to estimate the signal interference content and to perform interference attenuation preferably by filtering (filtering out). The spatial signature can be used in the transmission of the downlink phase, but primarily without filtering out the interference, because the sources of interference in uplink and downlink are generally not the same. After the combination, a new channel estimation (H) can be performed in a second estimation block S and correction in a channel corrector EQ. The channel corrected signal is decoded in a decoder DEC to determine the signal transmitted from the terminal. The receiver block RX transmits the spatial signature formed on the basis of the channel filtering terms to the transmitter block TX to be used in data transmission from the access point to the terminal.

Although the combination block C is presented above to be placed in the frequency domain right after the channel estimation block w1, w2, wn, the combination block can also be placed either in the time domain before the time and frequency offset correction blocks E1, E2, En, wherein the correction of time and frequency offsets and channel estimation are performed on the combined signal, or alternatively after the channel corrector EQ. In this latter alternative, the channel corrections are thus performed separately for each receiving block, after which the signals are first combined for decoding.

FIG. 4 shows the structure of a transmitter block according to an advantageous embodiment of the invention in a reduced block chart. The bits to be transmitted from the access point AP1, AP2 to the terminal MT1–MT4 are encoded and modulated in an encoding and modulation block M. After this, the modulated signal is led to an antenna adapter W to weight the modulated signal and to divide it into different transmission branches on the basis of the spatial signature transmitted by the receiver block RX to the transmitter block TX and based on the channel estimations made. The purpose of this is to maximize the power received by the desired terminal. Each transmission branch preferably comprises a frequency-to-time converter IFFT1, IFFT2, IFFTn for converting the signal to the time domain. Furthermore, the transmission branches have a digital-to-analog converter DA1, DA2, DAn for converting a digital signal into analog form, before the signal is led to the high frequency part RF1, RF2, RFn and antenna ANT1, ANT2, ANTn of the transmission branch.

In the above-described receiver block RX, e.g. the time-to-frequency converters can also be implemented with one time-to-frequency converter FFT1, FFT2, FFTn, if there is a sufficiently fast converter available as well as a required memory capacity for storing the information produced in the correction blocks of the receiver branches before the time-to-frequency conversion. In a corresponding manner, the frequency-to-time conversions can be made in one sufficiently fast frequency-to-time converter IFFT1, IFFT2, IFFTn in the transmission block TX. Also in this case, the access point AP1, AP2 must have a sufficient memory capacity for intermediate storage of the signals to be converted to the time domain.

In the following, the invention will be described in a situation in which the same time slot of the transmission phase and the receiving phase are used in data transmission between the access point AP1, AP2 and more than one terminal MT1–MT4. Such a situation is illustrated in the appended FIGS. 5 and 6. FIG. 5 shows receiving operation and FIG. 6 shows transmission operation. For clarity, FIGS. 5 and 6 show the operational blocks required for serving two terminals only, but the operation can be easily expanded to cover several terminals using the same time slot. The operation of the high-frequency part RF1, RF2, RFn and the analog-to-digital converter AD1, AD2, ADn of the receiver branch RX substantially corresponds to the situation of one terminal. After this, the signals converted into digital format are transferred in the correction block E in such a way that the corrections are made separately for these signals of different terminals on the basis of time and frequency offset estimates stored in a memory. In practical applications, this can be made either in parallel, i.e. so that the separate operational blocks E11, E12 are implemented for each terminal to be served simultaneously, or in serial format (consecutively), wherein the same operational parts are used for processing the signal transmitted by each terminal. This latter alternative requires more memory capacity, because the digital samples of the signals must be stored to wait for processing. In the example of FIG. 5, the principle of parallel performance is applied, wherein the correction block E is divided into two different correction parts E11, E12.

The first correction part E11 is used for correction of time and frequency offset according to a first terminal and, respectively, the second correction part E12 is used for correction according to a second terminal. Also in this situation, the corrections are based on time and frequency offset estimations made for different terminals in an earlier frame at the access point. Thus, the correction part E11, E12 uses terms of correction of timing and frequency offsets estimated for the terminal. FIG. 3 shows, with a thick line, the path of signals of the first terminal in the receiver block RX and, with a respective thin line, the path of signals of the second terminal in the receiver block RX. After the correction, the terminal-specific signals are subjected in the receiver branches RX to time-to-frequency conversions FFT11, FFT12; FFT21, FFT22; FFTn1, FFTn2, after which the signals of each terminal, converted to the frequency domain, are combined in combination blocks C1, C2 to one terminal-specific signal. This is performed on the basis of spatial signatures estimated in the earlier frame. The combined signals of different terminals can still be subjected to channel estimation S1, S2 and channel correction EQ1, EQ2 before decoding. In the decoder DEC1, DEC2, the signal of each terminal is decoded to be used in other operations of the access point, such as transmission of the signal further to a data network.

In a corresponding manner, the transmission operation can be implemented in a way presented in the example of FIG. 6, primarily like the transmitter of FIG. 4. As an addition in this example, there are signal encoding and modulation blocks M1, M2 for each terminal to be served simultaneously. Also the corrections to be performed on the basis of the spatial signatures are divided into separate blocks, but in practical applications, it is also possible to apply either parallel operation or serial operation in the transmitter. The encoded and modulated signals are transferred to a channel compensation block W, in which the signals are subjected to channel compensation on the basis of channel estimates, wherein the signal to be led to each antenna branch is weighted so that each terminal to be served will receive the signal intended for it at a maximum output, but signals intended for other terminals to be served simultaneously at a minimum output. From the channel compensation block W1, W2, the signals are transferred to a summing block with a summer SUM1, SUM2, SUMn for each antenna branch. In the summer, the signals of different terminals are summed. These combined signals are further subjected to frequency-to-time conversion in a frequency-to-time conversion block, after which the signals are converted to analog signals. The analog signals are further converted to radio-frequency signals in a radio part, and led to the antenna.

In this context, it should be mentioned that even though the service of one terminal (FIGS. 3 and 4) and the service of several terminals (FIGS. 5 and 6) have been described above by means of separate charts, it is obvious that in practical applications, the same receiver block and transmission block are used at access points in both situations. Thus, it is possible to operate in such a way that when one terminal is being served at a time, the timing and frequency offsets as well as the channel are estimated and corrected in the receiver and said estimates are stored in a memory. When several terminals are being served simultaneously, the timing and frequency offset and channel estimates (spatial signatures) stored in the memory are used. Thus, the timing and frequency offset and channel estimates are updated at intervals.

In another advantageous embodiment of the invention, in a situation of serving several terminals, signal combination and the compensation of timing and frequency offsets are performed after the analog-to-digital conversion in the time domain, before the frequency-to-time conversions. Thus, the terminal-specific estimates for timing and frequency offsets do not need to be stored in a memory. One advantage of this embodiment is that the change in the time and frequency offsets can be even faster than the rate of channel changes. In a corresponding manner, signal weighting can thus be made at the access point in the transmission phase first after the frequency-to-time conversion in the time domain.

In a communication system applying only one training sequence in the transmission of signals, only one radio channel used by the terminal can be estimated at a time. However, if the properties of the radio channel do not change too fast and if the other relevant properties, such as timing and frequency offsets, remain relatively constant, the space division multiple access technology can be applied in such a way that the estimations are made at different times for different terminals. These estimates are stored in a memory, wherein they are used in the transmission of signals from the access point to the terminal and in the reception of signals from the terminal at the access point, respectively, until the estimation is performed for the terminal the next time. How often the estimation is performed, will depend e.g. on the fact how rapidly the properties of the radio channel change.

In the method according to the present invention, one substantial fact is that during the time when the access point is performing timing and frequency offset estimations for one terminal, the other terminals must not transmit to the access point in question. This means that the access point allocates one or more uplink time slots UL for transmission by the terminal to be measured and another time slot or time slots for other terminals, if necessary. In the HIPERLAN/2 system, the access point can perform this allocation of time slots independently, irrespective of other possible access points. When the access point is not performing timing offset, frequency offset or channel estimations, the access point can allocate the same transmission and downlink time slots for several terminals, if the terminals are located in such a way that their spatial signatures are sufficiently different. Furthermore, the access point can take measurements on a signal possibly transmitted by a terminal during a random access phase RA.

FIG. 7 shows, in a reduced chart, an example situation in which space division timing is applied in the timing of downlink and uplink time slots to be allocated to terminals. In the example, two terminals are used, the time slots reserved for them shown in the figures, but it is obvious that in practical applications, there may be downlink and uplink time slots allocated for several different terminals in one frame. In the first frame indicated with reference 701 in FIG. 7, the upnlink time slots 702, 703 allocated for terminals MT1, MT2 are placed one after the other in time, wherein the terminals MT1, MT2 do not transmit simultaneously. Thus, the access point converts the signal received from the first terminal MT1 to digital format and performs time and frequency offset and channel estimation on the basis of the time slot 702, as presented above. The access point stores the estimation results in a memory and performs the corresponding operations on the basis of the signal received from the second terminal MT2 during the time slot 703. After the access point has performed the timing offset, frequency offset and channel estimations, the access point performs a deduction to find out if it is possible to allocate overlapping downlink and/or uplink time slots to some terminals MT1, MT2. In the situation of FIG. 7, the access point has allocated overlapping downlink time slots 704, 705 as well as uplink time slots 706, 707 to two terminals MT1, MT2. The lengths of these time slots are not necessarily the same, because the quantity of information to be transmitted is not necessarily the same. Furthermore, the estimation can also be performed for the time of more than one time slot, wherein the estimation accuracy can be improved. The access point can also monitor the stability of the channel and the timing and frequency offsets of the terminals to determine which terminals have connections in which space division multiple access technology can be applied. On the other hand, on the basis of the stability monitoring, the access point can also determine how often said estimations should be performed.

In view of downlink time slots, the access point primarily needs to perform estimation of the spatial signatures of the terminals, but in view of uplink time slots, timing and frequency offset estimation is also needed to apply space division multiple access technology.

In the same frame, it is possible to use both the principle of serving one terminal and the space division timing, wherein the same frame may contain such time slots in which only one terminal transmits/receives and such time slots in which two or more terminals transmit/receive at least partly simultaneously. Timing offsets are normally slightly changed according to the position of the time slot addressed for the terminal in the data frame. Thus, the position of the time slots in the frame to be used for estimation of terminals to be served simultaneously can be advantageously selected to be substantially the same as the position of simultaneous uplink and downlink time slots to be addressed later on to these terminals in the data frame. This means that the estimation of different terminals is performed in different data frames. Alternatively, the access point may attempt to model the changing of the timing and frequency offsets of the terminals, wherein the access point can perform estimation of several terminals during one frame but not simultaneously but in different time slots. On the basis of the estimation and the modelling, the access point can estimate the parameters to be used in the correction, even though the position of the estimation time slots were different from the position of the time slots used in the connection.

The data transmission capacity is preferably maximized by minimizing the time when the access point serves only one terminal at a time. Thus, the duration of the transmission of a terminal in the uplink time slots of the estimation frames is advantageously set as short as possible. This can be achieved for example in such a way that the access point transmits to the terminal a control message or the like which has the effect that the terminal transmits only the training sequence or a so-called empty packet in the time slot to be used in estimation. Furthermore, in a situation in which the terminal only seldom sends information to the access point, the access point can control the terminal to send only the training sequence or an empty packet before the transmission of the actual information. On the basis of this received training sequence, the access point can thus determine e.g. the spatial signature of the terminal and set the directional pattern of the antenna suitable. On the other hand, the access point can request for example the transmission of measurement data at intervals, if the terminal has only infrequently information to be transmitted. For example, in the HIPERLAN/2 system, the terminal takes measurements, such as measurements of the received signal strength (RSS), and reports on these to the access point.

Further, FIG. 8 shows a situation in which the access point performs estimation in such data frames in which two or more terminals are served simultaneously. Also in this case, estimation has been performed at least once by the above-described method, wherein the access point has determined for example the terminals which can be served simultaneously. Furthermore, the access point has timed the uplink time slots of such terminals to be served simultaneously in such a way that one terminal starts the transmission before the other terminals. For example, in FIG. 8, in the first data frame 801, a first terminal MT1 starts the transmission 802 of a training sequence before the transmission 803, 804 of the other terminals MT2, MT3. This transmission of the training sequence is illustrated with a darker part in the uplink time slots allocated for the transmission 802, 803, 804 by different terminals. It is essential in this advantageous embodiment of the invention that when this terminal transmitting first is transmitting a training sequence, the other terminals are not transmitting. In the example situation of FIG. 8, a second terminal MT2 starts a transmission 805 before the beginning of the transmission 806, 807 of the other terminals MT1, MT3 in a second data frame 808.

Thus, for each terminal, the access point must determine whether space division multiple access technology can be applied for it, that is, whether the terminal can be served simultaneously with one or more other terminals. Furthermore, the access point must select the terminals to be served simultaneously. This selection can be made e.g. one data frame at a time, or less frequently. The successful making of these deductions is affected e.g. by the fact how well the access point can determine the spatial signature of each terminal. For example, if two terminals are located very close to each other in the same room, the access point may find the spatial signatures of these terminals to be very similar. Thus, the access point may deduce that they cannot be served simultaneously. It is obvious that the terminals to be served simultaneously are not necessarily the same all the time, but they can be changed. Also the number of terminals to be served simultaneously can vary.

In view of applying space division multiple access technology, it is advantageous that the lengths of the transmissions, i.e. the packets, of the terminals to be served simultaneously are in the same order. Thus, also the packet length can be used as a criterion for selecting the terminals to be served simultaneously. On the other hand, the access point can have some effect on the packet length. For example, a long packet can be split into smaller parts which are transmitted separately. Thus, a shorter packet intended for another terminal can have the length of such a part of a longer packet, and said short packet can be transmitted together with the part of the longer packet by space division multiple access.

FIG. 9 shows a terminal MT1 according to yet another advantageous embodiment of the invention, and FIG. 10 shows an access point according to an advantageous embodiment of the invention. The mobile terminal MT1 preferably comprises data processing functions PC and communication means COM for setting up a data transmission connection to a wireless local area network. The mobile terminal can also be formed in such a way that a data processing device, such as a portable computer, is connected with e.g. an auxiliary card comprising said communication means COM. The data processing functions PC preferably comprise a processor 2, such as a microprocessor, a microcontroller or the like, a keypad 3, a display means 4, memory means 5, and connection means 6. Further, the data processing functions PC can comprise audio means 7, such as a speaker 7a, a microphone 7b, and a codec 7c, wherein the user can also use the mobile terminal MT1 e.g. for the transmission of speech. Information intended to be transmitted from the mobile terminal MT1 to the local area network is preferably transferred via the connection means 6 to the communication means COM. In a corresponding manner, information received from the local area network 1 in the mobile terminal MT1 is transferred to the data processing functions PC via said connection means 6.

The communication means COM preferably comprise e.g. an antenna 30, an antenna switch 27, a radio part 8, an encoder 9, a modulator 20, a demodulator 21, a decoder 10, a control means 11, and a reference oscillator 12. Further, the communication means COM comprise a memory 13 e.g. for forming transmission and receiving data buffers required in the communication. The reference oscillator 12 is used to form the necessary timings to synchronize the transmission and reception to the transmission and reception of the access point, as will be described below in this description. The reference oscillator 12 can also be used to form timing signals for the control means 11. It is obvious that the frequency formed by reference oscillator 12 cannot be used as such to set the channel frequency and to form the timing signals for the control means 11, wherein in practical solutions, frequency conversion means (not shown) are used to convert the frequency of the reference oscillator 12 to frequencies required in the radio part and to a frequency suitable for controlling the operation of the control means 11.

In a corresponding manner, the access point AP1 comprises first communication means 15 for setting up a data transmission connection to mobile terminals MT1–MT4. The wireless network 1 according to the invention can be implemented as a local area network with no connection to external data networks. Thus, it may be sufficient to have one access point AP1 to which the mobile terminals MT1–MT4 of the local area network are connected. In the wireless local area network, a data transmission connection 16 is preferably arranged from one or more access points AP1, AP2 to a data processing device S which is generally called a server computer or, shorter, a server. Such a server comprises, in a way known as such, data bases of a firm, application software, etc. in a centralized manner. The users can thus start up applications installed on the server via the mobile terminal MT1. The server S or access point AP1 can also comprise second communication means 17 for setting up a data transmission connection to another data network, such as the Internet network or the UMTS mobile communication network.

Each access point and mobile terminal is allocated an identification, wherein the access points are aware of which mobile terminals are coupled to the access point at a time. In a corresponding manner, the mobile terminals make a distinction between the frames transmitted by different access points. These identifications can also be used in such a situation in which the connection of a mobile terminal is handed over from one access point to another access point, e.g. as a result of impaired quality of connection.

In the method according to the present invention, the functions can, for a major part, be implemented in the application software of the access point AP1, AP2, such as in the application software of a controller 19 and/or in the application software of a digital signal processing unit 24, wherein significant changes in the equipment according to prior art are not necessary. On the other hand, part of the signal processing functions, such as time-to-frequency conversions and frequency-to-time conversions can also be implemented by utilizing hardware-based solutions.

It is obvious that the present invention is not limited solely to the embodiments presented above, but it can be modified within the scope of the appended claims.

What is claimed is:

1. A method for arranging communication between terminals (MT1–MT4) and an access point (AP1, AP2) in a communication system (1) applying data transmission frames (FR) which comprise at least uplink timeslots (UL) for performing data transmission from the terminals (MT1–MT4) to the access point (AP1, AP2), and downlink timeslots (DL) for performing data transmission from the access point (AP1, AP2) to the terminals (MT1–MT4) via a wireless communication channel, and in which method the terminals (MT1–MT4) can be allocated one or more timeslots (702–707, 802–807) of said frames, characterized in that in at least part of said frames (FR), at least partly simultaneous timeslots (704–707, 802–804) are allocated to at least two terminals (MT1–MT4), wherein in the method, a spatial signature of at least said two terminals (MT1–MT4) is determined, that in the method, measurements are taken to estimate timing and frequency offsets and properties of the communication channel, which measurements are taken at least partly on the basis of a signal transmitted by the terminal (MT1) to the access point (AP1, AP2), wherein the results of said measurements are used to select the terminals (MT1–MT4) to which simultaneous timeslots (702–707, 802–807) are to be allocated, and that during said measurements, an other terminal of the terminals (MT1–MT4) communicating with the access point (AP1, AP2) does not transmit a signal to said access point (AP1, AP2).

2. The method according to claim 1, characterized in that in the method, simultaneous transmission and/or reception for at least two terminals is implemented on the basis of selection of terminals (MT1–MT4) made on the basis of said measurement results.

3. The method according to claim 1, characterized in that in the data transmission frames (FR), also a random access phase (RA) is used, during which the terminal (MT1–MT4) can perform transmissions to the access point (AP1, AP2), that signals transmitted in said random access phase (RA) are stored at the access point, and that the stored signals are used to determine the spatial signature of the terminal (MT1–MT4).

4. The method according to claim 1, characterized in that stored signals are used to determine time and frequency offsets of the terminal (MT1–MT4).

5. The method according to claim 1, characterized in that said measurements are used to determine the position of the terminal (MT1–MT4).

6. The method according to claim 1, characterized in that in data transmission from the terminal (MT1–MT4) to the access point (AP1, AP2), at least the following steps are taken:
- a receiving step, in which signals transmitted by a terminal are received with at least two different antennas,
- a first correction step, in which the received signals are corrected on the basis of the measured time and frequency offsets,
- a first conversion step, in which the corrected signals are subjected to time-to-frequency conversion,
- a first channel estimation step, in which the signals converted to a frequency domain are subjected to channel estimation and determination of the spatial signature,
- a combination step, in which the signals are combined, and
- a decoding step for decoding the combined signal to determine the information transmitted from the terminal (MT1–MT4).

7. The method according to claim 6, characterized in that said combination step is taken before said first correction step.

8. The method according to claim 6, characterized in that at least said first conversion step is taken substantially simultaneously for signals relating to different terminals.

9. The method according to claim 6, characterized in that at least said first conversion step is taken consecutively for signals relating to different terminals.

10. The method according to claim 6, characterized in that after the combination step, also a second channel estimation and correction step is taken, in which properties of the communication channel are estimated on the basis of the combined signal, and the combined signal is corrected on the basis of the estimated properties of the communication channel.

11. The method according to claim 6, characterized in that said combination step is taken after said second channel estimation and correction step.

12. The method according to claim 6, characterized in that signals transmitted by at least two different terminals are received at the access point substantially simultaneously, wherein said first correction step, first conversion step, combination step and decoding step are taken separately for the signal of each terminal.

13. The method according to claim 6, characterized in that in data transmission from the access point (AP1, AP2) to the terminal (MT1–MT4), at least the following steps are taken:
- an encoding step for encoding the signal to be transmitted,
- a weighting step, in which at least two transmission signals are formed of the signal to be transmitted,
- a second conversion step, in which said at least two transmission signals are subjected to frequency-to-time conversion, and
- a transmission step, in which the transmission signals converted to a time domain are transmitted.

14. The method according to claim 13, characterized in that the access point transmits to at least two different terminals (MT1–MT4) substantially simultaneously, wherein said encoding step and weighting step are taken separately for each signal to be transmitted to a terminal (MT1–MT4), and that in said weighting step, at least two transmission signals are formed of the signal to be transmitted to each terminal (MT1–MT4).

15. The method according to claim 13, characterized in that at least some of said steps are taken substantially simultaneously for signals relating to different terminals (MT1–MT4).

16. The method according to claim 13, characterized in that at least some of said steps are taken consequtively for signals relating to different terminals (MT1–MT4).

17. The method according to claim 13, characterized in that in the method, the access point (AP1, AP2) uses an array of several antennas (ANT1, ANT2, ANTn) and having a variable directional pattern.

18. The method according to claim 17, characterized in that the antenna of the access point (AP1, AP2) used is an array of at least two antennas (ANT1, ANT2, ANTn), that signals are received at the access point (AP1, AP2) by the antennas (ANT1, ANT2, ANTn) of the array, and that signals transmitted by a terminal (MT1–MT4) and received via the antennas (ANT1, ANT2, ANTn) of the array are used in measurements.

19. The method according to claim 17, characterized in that information about the measured timing and frequency offsets as well as the spatial signature of the terminal (MT1–MT4) is stored at the access point (AP1, AP2), and that information is used at least in a next data frame during the timeslots (702–707, 802–807) addressed to said terminal (MT1–MT4), to modify the directional pattern of the array of antennas and to perform time and frequency corrections.

20. The method according to claim 17, characterized in that the timing and frequency offsets of the terminal (MT1–MT4) are measured with at least two different antennas (ANT1, ANT2, ANTn), and that an average is formed of the timing and frequency offsets measured with the different antennas (ANT1, ANT2, ANTn).

21. The method according to claim 17, characterized in that at least said second conversion step is taken substantially simultaneously for signals relating to different antennas (ANT1, ANT2, ANTn).

22. The method according to claim 17, characterized in that at least said second conversion step is taken consecutively for signals relating to different antennas (ANT1, ANT2, ANTn).

23. The method according to claim 17, characterized in that in the method, for the remainder signal $$r_n[k,p]=x_n[k,p]-H_m[k]\times d[k]$$

a position correlation matrix is determined $$Q[k,p]=\bar{r}[k,p]\times\bar{r}[k,p]^H$$

in which $x_n[k,p]$ is the $n^{th}$ signal received from the antenna (ANT1, ANT2, ANTn) in the frequency domain at a subcarrier frequency corresponding to the $p^{th}$ teaching symbol transmitted by the terminal in a training sequence, d[k] is
the training symbol at a subcarrier $$k, H_n[k] = \left(\frac{1}{2}\sum_{p=1}^{2} x_n[k, p]\right) \times d[k]^*$$

is one possible estimate for the frequency-domain radio channel calculated for the subcarrier k between the terminal and the antenna (ANT1, ANT2, ANTn) of the array of antennas of the base station, $$\bar{r}[k,p] = (r_0[k,p], r_1[k,p], r_2[k,p], Kr_{N-1}[k,p])^T$$

the superscript H refers to complex conjugate transposition, the superscript * refers to complex conjugate, and the superscript T refers to transposition.

24. The method according to claim 17, characterized in that said measurements are taken during several timeslots to improve the accuracy of timing, frequency offset and channel estimates as well as to estimate time stability of the timing offset, frequency offset and channel properties, wherein the stability estimates are used to select the terminals (MT1–MT4) which are allocated simultaneous timeslots (702–707, 802–807).

25. Method according to claim 24, characterized comprising using said stability estimates in determining the frequency of future measurements.

26. The method according to claim 23, characterized in that in the method, at least the following steps are taken:
a first weighting coefficient vector
$\bar{w}[k] = (H_0[k], H_1[k], H_2[k], K, H_{N-1}[k])^T$ is formed on the basis of the spatial signature,
said correlation matrix (Q[k,p]) is averaged over the frequency,
an inverse matrix is calculated for the averaged space correlation matrix,
said inverse matrix is averaged over the training symbols, and
a second weighting coefficient vector is formed by multiplying the first weighting coefficient vector with the averaged inverse matrix:

$$\bar{w}_{opt}[k] = \left\{ \frac{1}{P} \sum_{p=1}^{P} \left[ \left( \frac{1}{K} \sum_{k=0}^{K-1} Q[k, p] \right) + \gamma \times I \right]^{-1} \right\} \times \bar{w}[k],$$

in which 1 is N×N unit matrix and γ is a certain small constant.

27. The method according to claim 1, characterized in that in the method, spatial filtering is performed in a time domain before estimation and correction of the timing and frequency offsets of the terminal (MT1–MT4), wherein the spatial signature of the terminal (MT1–MT4) is estimated on a basis time-domain signals corresponding to the different antenna elements, that a spatial signature is stored to be used in transmission and reception, and that the time and frequency offsets in the space filtered signal are estimated and corrected, and that a corrected signal is subjected to at least a conversion step to perform time-to-frequency conversion, a channel estimation step to perform and correct channel estimation, and a decoding step to decode the corrected signal to find out the information transmitted from the terminal (MT1–MT4).

28. The method according to claim 27, characterized in that the estimation of the spatial signature is performed by a recursive least squares (RLS) algorithm.

29. The method according to claim 27, characterized in that the spatial signature of the time domain is calculated on the basis of channel estimates of the frequency domain.

30. The method according to claim 27, characterized in that the access point receives substantially simultaneously signals transmitted by at least two different terminals, wherein said spatial signatures stored in a memory are used in spatial filtering, and that said combination step, first correction step, first conversion step, first channel estimation step, and decoding step are separately performed for the signal of each terminal.

31. The method according to claim 27, characterized in that in data transmission from the access point to the terminal, the weighting of signals to be led to the antennas (ANT1, ANT2, ANTn) is performed at the access point (AP1, AP2) after the second conversion step in the time domain.

32. The method according to claim 1, characterized in that the position of timeslots to be used for estimation of terminals (MT1–MT4) to be served simultaneously is selected to be substantially the same as the position of simultaneous uplink and downlink timeslots to be allocated to these terminals (MT1–MT4) later on in the data frame (FR).

33. The method according to claim 1, characterized in that the data transmission capacity is maximized by minimizing the time used by the access point for serving only one terminal at a time.

34. The method according to claim 33, characterized in that in the time slot used for estimation, the terminal only transmits a training sequence or an empty packet.

35. The method according to claim 1, in which the terminals transmit information in packets, characterized in that the lengths of the packets transmitted by the terminals to be served simultaneously are set to be substantially equal.

36. The method according to claim 35, characterized in that to set the packet length, packets are split into smaller parts which are transmitted separately.

37. A communication system (1) comprising at least an access point (AP1, AP2) and terminals (MT1–MT4), means (8, 15) for data transmission between the terminals (MT1–MT4) and the access point (AP1, AP2), in which communication data transmission frames (FR) are arranged to be used, comprising at least uplink timeslots (UL) for data transmission from the terminals (MT1–MT4) to the access point (AP1, AP2), and downlink timeslots (DL) for data transmission from the access point (AP1, AP2) to the terminals (MT1–MT4) via a wireless communication channel (CH), and which communication system (1) comprises means (18) for allocating one or more timeslots (702–707, 802–807) of said frames to the terminals (MT1–MT4), characterized in that the communication system (1) also comprises:
means (18, 19) for allocating at least partly overlapping timeslots (704–707, 802–807) to at least two terminals (MT1–MT4) in at least part of said frames (FR),
means (ES) for determining the spatial signature of at least said two terminals (MT1–MT4),
means (RX) for taking measurements for estimating the timing and frequency offsets of the terminal (MT1–MT4) and the properties of the communication channel at least partly on the basis of the signal transmitted by the terminal (MT1) to the access point (AP1, AP2),
means (19) for selecting the terminals (MT1–MT4) which are allocated overlapping timeslots (702–707, 802–807), in which selection the results of said measurements are arranged to be used, and means (18) for preventing transmission to the access point (AP1, AP2) by other terminals (MT2–MT4) communicating with the access point (AP1, AP2) during said measurements.

38. An access point (AP1, AP2) comprising means (15) for data transmission between terminals (MT1–MT4) and the access point (AP1, AP2) in a communication system (1), in which data transmission data transmission frames (FR) are arranged to be used, comprising at least uplink timeslots (UL) for data transmission from the terminals (MT1–MT4) to the access point (AP1, AP2), and downlink timeslots (DL) for data transmission from the access point (AP1, AP2) to the terminals (MT1–Mt4) via a wireless communication channel (CH), and which communication system (1) comprises means (18) for allocating one or more timeslots (702–707, 802–807) of said frames to the terminals (MT1–MT4), characterized in that the access point (AP1, AP2) also comprises:
   means (18, 19) for allocating at least partly overlapping timeslots (704–707, 802–807) to at least two terminals (MT1–MT4) in at least part of said frames (FR),
   means (ES) for determining the spatial signature of at least said two terminals (MT1–MT4),
   means (RX) for taking measurements for estimating the timing and frequency offsets of the terminal (MT1–MT4) and the properties of the communication channel at least partly on the basis of the signal transmitted by the terminal (MT1) to the access point (AP1, AP2),
   means (19) for selecting the terminals (MT1–MT4) which are allocated overlapping timeslots (702–707, 802–807), in which selection the results of said measurements are arranged to be used, and
   means (18) for preventing transmission to the access point (AP1, AP2) by other terminals (MT2–MT4) communicating with the access point (AP1, AP2) during said measurements.

39. The access point (AP1, AP2) according to claim 38, characterized in that the data transmission frames (FR) also apply a random access phase (RA), during which the terminal (MT1–MT4) can perform transmissions to the access point (AP1, AP2), that said access point comprises means (14) for storing signals transmitted in said random access phase (RA), and means (19) for using the stored signals to determine the spatial signature of the terminal (MT1–MT4).

40. The access point (AP1, AP2) according to claim 38, characterized in that the access point (AP1, AP2) comprises an array of several antennas (ANT1, ANT2, ANTn) and having a variable directional pattern.

41. The access point (AP1, AP2) according to claim 40, characterized in that the antenna of the access point (AP1, AP2) used is an array of at least two antennas (ANT1, ANT2, ANTn), that the access point (AP1, AP2) comprises means for receiving signals with the antennas (ANT1, ANT2, ANTn) of the array, and means for using signals transmitted by the terminal (MT1–MT4) and received via the antennas (ANT1, ANT2, ANTn) of the array, in measurements.

42. The access point (AP1, AP2) according to claim 40, characterized in that it comprises means (14) for storing information on the timing and frequency offsets of the terminal (MT1–MT4), and means (19, ANT1, ANT2, ANTn) for changing the directional pattern of the antenna in at least the next data frame for the time of timeslots (702–707, 802–807) addressed to said terminal (MT1–MT4) on the basis of the spatial signature of said terminal (MT1–MT4).

43. The access point (AP1, AP2) according to claim 40, characterized in that it comprises means (ANT1, ANT2, ANTn, RX) for measuring the timing and frequency offsets of the terminal (MT1–MT4) with at least two different antennas, and means (19) for forming an average of the timing and frequency offsets measured with the different antennas.

44. The access point (AP1, AP2) according to claim 40, characterized in that the means (ANT1, ANT2, ANTn, RX) for measuring the timing and frequency offsets of the terminal (MT1–MT4) comprise at least:
   receiving means (RF1, RF2, RFn) for receiving signals transmitted by the terminal with at least two different antennas,
   correction means (E1, E2, En) for correcting the received signals on the basis of the measured time and frequency offsets,
   first conversion means (FFT1, FFT2, FFTn) for performing a time-to-frequency conversion on the corrected signals,
   channel estimation means (w1, w2, wn) for performing channel estimation on the signals converted to a frequency domain,
   combining means (C) for combining the filtered signals, and
   decoding means (DEC) for decoding the combined signal to determine the information transmitted from the terminal (MT1–MT4).

45. The access point (AP1, AP2) according to claim 44, characterized in that it also comprises channel correction means (EQ) for correcting the combined signal on the basis of the properties of the communication channel estimated from the combined channel.

46. The access point according to claim 44, characterized in that it comprises means for receiving signals transmitted by two different terminals substantially simultaneously, wherein the access point (AP1, AP2) comprises said correction means, first conversion means (FFT1, FFT2, FFTn), combining means (C) and decoding means (DEC) for processing the signal of each terminal separately.

47. The access point (AP1, AP2) according to claim 40, characterized in that in data transmission from the access point (AP1, AP2) to the terminal (MT1–MT4), at least the following steps are taken:
   encoding means (M) for encoding the signal to be transmitted,
   weighting means (W) for forming at least two transmission signals from the signal to be transmitted,
   second conversion means (IFFT1, IFFT2, IFFTn) for performing a frequency-to-time conversion on said at least two transmission signals, and
   transmission means (RF1, RF2, RFn) for transmitting the transmission signals converted to a time domain.

48. The access point (AP1, AP2) according to claim 47, characterized in that it comprises means (TX) for transmitting signals to at least two different terminals substantially simultaneously, wherein the access point (AP1, AP2) comprises said encoding means (M) and weighting means (W) for processing the signals to be transmitted to each terminal substantially simultaneously.

* * * * *